United States Patent
Gilliland et al.

(10) Patent No.: US 6,179,472 B1
(45) Date of Patent: Jan. 30, 2001

(54) BALL BEARING OIL/GREASE LOSS CONTAINMENT METHOD

(75) Inventors: Larry Joe Gilliland; Holavanahally Seshachar Nagaraj; Daniel Stacer, all of Morgan Hill, CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/170,377

(22) Filed: Oct. 13, 1998

(51) Int. Cl.$^7$ ...................................... F16C 33/78
(52) U.S. Cl. ................. 384/477; 384/480; 384/484; 277/562; 277/925
(58) Field of Search ........................ 384/477, 480–486; 277/570, 925, 565, 562

(56) References Cited

U.S. PATENT DOCUMENTS

| | | | |
|---|---|---|---|
| 3,400,989 | * 9/1968 | Dixon et al. | 384/482 |
| 3,414,275 | 12/1968 | Takahashi . | |
| 3,700,296 | * 10/1972 | Bugmann | 384/484 |
| 3,709,572 | 1/1973 | Pethis . | |
| 3,768,880 | 10/1973 | Howe . | |
| 4,054,334 | * 10/1977 | McAllister et al. | 384/484 |
| 4,428,629 | 1/1984 | Colanzi et al. . | |
| 4,588,312 | 5/1986 | Dickinson et al. | 384/487 |
| 4,827,168 | 5/1989 | Nakajima | 384/488 X |
| 5,132,856 | 7/1992 | Takahashi | 384/470 X |
| 5,383,728 | * 1/1995 | Micca et al. | 384/482 |
| 5,433,533 | 7/1995 | Imazaike | 384/488 |
| 5,480,235 | 1/1996 | Arai | 384/484 |
| 5,649,772 | * 7/1997 | Schlereth et al. | 384/484 |

FOREIGN PATENT DOCUMENTS

| | | |
|---|---|---|
| 1140208 | 1/1969 | (GB) . |
| 1-182619 | 7/1989 | (JP) . |
| 3-37415 | 2/1991 | (JP) . |
| 3-129121 | 6/1991 | (JP) . |
| 6-66321 | 3/1994 | (JP) . |
| 7-121978 | 5/1995 | (JP) . |

* cited by examiner

*Primary Examiner*—Thomas R. Hannon
(74) *Attorney, Agent, or Firm*—Altera Law Group, LLC

(57) ABSTRACT

Shield designs for ball bearing based spindle motors that exhibit containment of grease and the base oil within the bearings at accelerated conditions of temperature and speed are provided at the shield OD contact area, the use of an impervious shield material, the use of barrier films, shield/bearing designs that use tortuous paths and labyrinth schemes for reducing the oil and grease loss from the shield ID gap of DASD spindle ball bearings, and stainless steel shield designs.

3 Claims, 18 Drawing Sheets

BALL BEARING OIL/GREASE LOSS CONTAINMENT METHOD

BACKGROUND OF THE INVENTION

1. Field of the Invention

This invention relates in general to motors, and more particularly to methods for containing oil and/or grease loss in ball bearings of spindle motors.

2. Description of Related Art

Disk drives are computer mass storage devices from which data may be read and/or to which such data may be written. In general, they comprise one or more randomly accessible rotating storage media, or disks, on which data is encoded by various means. In magnetic disk drives, data is encoded as bits of information including magnetic field reversals grouped in tracks on the magnetically-hard surface of the rotating disks. The disks are stacked in a generally parallel and spaced-apart relationship and affixed at their inner diameter ("ID") to a common hub which is rotationally coupled to a stationary spindle shaft by a pair of bearings, typically ball bearings.

Spindle motors for direct access storage devices (DASDs) currently utilize high quality ball bearings that are lubricated for life using a metered amount of grease. The ball bearings are generally fitted with non-contact rubber shields one on each side. The shields have a small radial gap (0.2 to 0.25 mm) at the ID side, which is principally determined by the manufacturing tolerances and are pressed lightly into the groove in the outer ring. The elastomer in the shield is compressed in the process to provide a sealing effect. In these shields, metal (steel) backing is bonded to the elastomer. The metal backing side faces the inside of the bearing the conventional approach used in most bearings today. The elastomer widely used in ball bearings today is Nitrile Butadiene Rubber (NBR).

Recent experiments and experiences have shown significant oil loss and grease loss for the above spindle motors when tested under accelerated conditions of temperature and speed. It appears that three of the significant sources of this loss are: (1) from the shield outer diameter ("OD") contact area, (2) through the shield elastomeric material itself, and (3) from the shield ID gap.

The plausible mechanism of loss through shield/outer ring contact area is by creep or migration by virtue of insufficient scaling effect. The mechanism of oil loss through the shield is due to the permeation of oil molecules through the elastomer matrix. The plausible mechanisms are loss through aerosolization and loss via surface creep or migration and subsequent appearance of oil droplets on the outside surface of the shield. These droplets could then be either slung out due to centrifugal forces and/or evaporate. Loss through aerosolization increases greatly for increased rotational speeds and for higher temperatures because of reduced viscosity. Thus the ability to achieve higher than 10000 rpm for ball bearing based spindle motors depends on adequate containment of the grease and base oil within the bearings.

Previous designs in this area include various shield designs of the non-contacting type. FIG. 1 shows the type of shield 100 currently used in most types of DASD spindle motors in use today. FIG. 1 shows a cross sectional view of the shield 100. The metal backing 100 is bonded to the elastomer shield 120. The metal backing 110 faces the inside of the bearing in the conventional approach used in most bearings today. The elastomer 120 widely used in ball bearings today is Nitrile Butadiene Rubber (NBR). A first end 130 of the shield 100 contacts grooves at the outer race (not shown). A second end 140 forms a gap 142 at the inner race 144.

Significant oil/grease loss can also occur at the shield ID gap in the case of high speed (10000 rpm) ball bearings especially at the upper end of the temperature specification (70 to 80 C). Prior shield designs of the non-contacting type however exhibit less than desirable oil/grease containment characteristics. For example, FIGS. 2 and 3 show two types of shields 200, 300 currently being used in two different types of spindle motors. FIGS. 2 and 3 show a cross sectional view of the ball bearing, but because of symmetry only a portion of the view is shown.

In FIG. 2, a shield 210 faces the outer diameter 212 of the inner race 214. Also shown is the cage 220 and the ball bearing 222. In FIG. 3, the ID of the shield 310 faces a step 330 on the inner race 314. The ID gap 318 offers some resistance to aerosol loss based on the gap 318 and the thickness of the shield 310. The shield 310 in FIG. 3 offers a slightly higher resistance to flow when compared to the shied 210 of FIG. 2 by virtue of the small step 330 in the inner race 314. Whether or not a step 314 is possible is determined by thickness of the inner race 314.

Stainless steel shields are also used in ball bearings for spindle motors. Stainless steel shields offer some significant advantages over rubber shields: (1) Smaller gaps at the ID are possible with stainless steel shields because no molding process is involved. (2) Stainless steel shields can be much thinner than rubber shields (about one-half) because of higher strength, which would permit increased grease amounts to be charged into the bearings. In addition, stainless steel shields eliminate the mechanism of foil loss and of course a major source of outgassing (NBR) is eliminated with the use of stainless steel shield.

FIG. 4 shows the front view of a commercially available stainless steel shield 400 for a 5×13 ball bearing, e.g. a stainless steel shield as manufactured by NSK Corporation, Japan. Eight equally spaced slits or slots 410 approximately 0.12 mm wide are made in the shield 400 for ease of insertion in the bearing outer ring groove. The stainless steel shields for a larger 6×15 bearing is of similar design also.

FIG. 5 shows the rear view 500 of the same shield. Protrusions 520 measuring approximately 0.08 mm are clearly visible at the positions corresponding to the slots 410 illustrated in FIG. 4. Detailed and closer observations of these protrusions 520 reveal that the material 522 immediately next to them is not affected in terms of profile. Upon insertion of such a shield contact occurs at the protrusions 520 and far away from the protrusions. But, in the in-between areas 522 sufficient metal to metal contact is not likely to occur. This poses a major source of oil leakage path.

It can be seen that there is a need for improved shield designs for ball bearing based spindle motors that provide improved containment of grease and the base oil within the bearings at accelerated conditions of temperature and speed.

SUMMARY OF THE INVENTION

To overcome the limitations in the prior art described above, and to overcome other limitations that will become apparent upon reading and understanding the present specification, the present invention discloses improved shield designs for ball bearing based spindle motors that exhibit improved containment of grease and the base oil within the bearings at accelerated conditions of temperature and speed.

The present invention solves the above-described problems by providing improved shield designs at the shield OD contact area, the use of an impervious shield material, the use of barrier films, shield/bearing designs that use tortuous paths and labyrinth schemes for reducing the oil and grease loss from the shield ID gap of DASD spindle ball bearings, and improved stainless steel shield designs.

A system in accordance with the principles of the present invention includes at least one of an outer diameter shield improvements, an inner diameter shield improvements and an improved stainless steel shield design.

Other embodiments of a system in accordance with the principles of the invention may include alternative or optional additional aspects. One such aspect of the present invention is that a ball bearing shield includes an elastomeric body having an outer diameter sealing structure at an outer contact area adjacent a race for providing a seal between the elastomeric body and the race.

Another aspect of the present invention is that the outer diameter sealing structure comprises ridges for sealing the outer contact area against the race.

Another aspect of the present invention is that the ball bearing shield further includes a metal backing, wherein the elastomeric body is shortened with respect to the metal backing for reducing outgassing via the shield, the elastomeric body extending only a sufficient distance along the metal backing to form a bond between the elastomeric body and the metal backing.

Another aspect of the present invention is that the elastomeric body comprises a fluoropolymer material for preventing the formation of oil thereon.

Yet another aspect of the present invention is that the ball bearing shield includes an elastomeric body, the elastomeric body including a diverting structure for diverting aerosol away from the shield toward an inner diameter.

Another aspect of the present invention is that the diverting structure comprises a lip extending toward the inner diameter.

Another aspect of the present invention is that the diverting structure comprises an L-shaped extension extending toward the inner diameter.

Another aspect of the present invention is that a stainless steel shield body includes slots therein for facilitating folding of the stainless steel body to form a contact area and a barrier portion, the slots being defined by an optimized depth for preventing a hump forming adjacent the slot when the stainless steel body is folded.

Still another aspect of the present invention is that the stainless steel body is slotless to form a barrier to prevent loss of oil and grease.

Another aspect of the present invention is that the stainless steel body further includes slots therein for facilitating folding of the stainless steel body to form a contact area and a barrier portion, wherein the stainless steel body has a first width in an outer diameter area up to the radial extension of the slots and a second width from the slot terminating edge to the inner diameter.

Another aspect of the present invention is that the outer race further comprises a step at the inner diameter, the diverting structure fitting in the step to form a labyrinth structure to establish a seal at the inner diameter.

Another aspect of the present invention is that the application of surface films inhibits oil loss due to surface creep or migration mechanisms.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention addresses aspects of the shield OD area. The present invention uses superior oil impermeable elastomer, shield designs utilizing the least possible amount of elastomer and improved designs for better contact on the OD side of the shield. Another important source of oil loss from the bearings has been determined to be oil creep or migration on the surface of the shield itself. With the use of stainless steel shields, the high surface energy of the metal surface increases this creeping flow compared with an elastomeric surface. To mitigate this problem, a novel approach in terms of applying a low surface tension barrier film on the shield is disclosed in this invention. In addition, barrier film application at the outer ring groove area and end surface to eliminate any creeping flow on the outer ring surface is made a part of this invention. Tortuous paths and labyrinth schemes are used for reducing the oil and grease loss from the shield ID gap of DASD spindle ball bearings. Finally, improved stainless steel designs are described.

Figure 6:
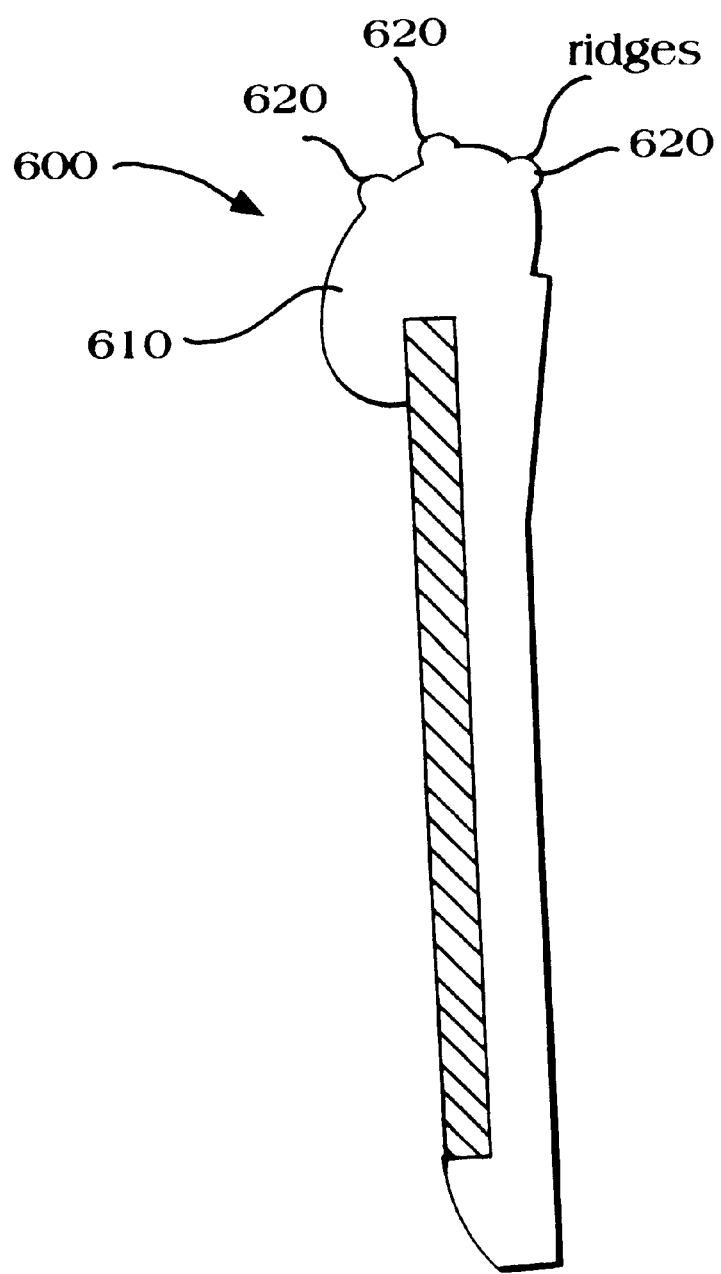
FIG. 6 shows an improved design of the shield surface at the bearing outer ring contact area according to the present invention.

FIG. 6 shows an improved design of the shield surface 600 at the bearing outer ring contact area 610 according to the present invention. FIG. 6 illustrates the formation of a number of ridges 620 that run along the circumference of the outer contact area 610 of the shield 600. These ridges 620 may be nearly semicircular in cross section and may be as high as 0.05 to 0.1 mm. Upon installation of the shield 600 into the groove in the bearing outer ring (not shown), these ridges 620 deform greatly and conform to the surface of the groove. This intimate contact provides a good seal against oil loss and migration. For O-rings, adequate compression on the order of 20% to 30% achieves a good seal. From this perspective, having these ridges 620 such as depicted in FIG. 6 assures high local compression ratios, thus achieving a good seal.

Figure 7:
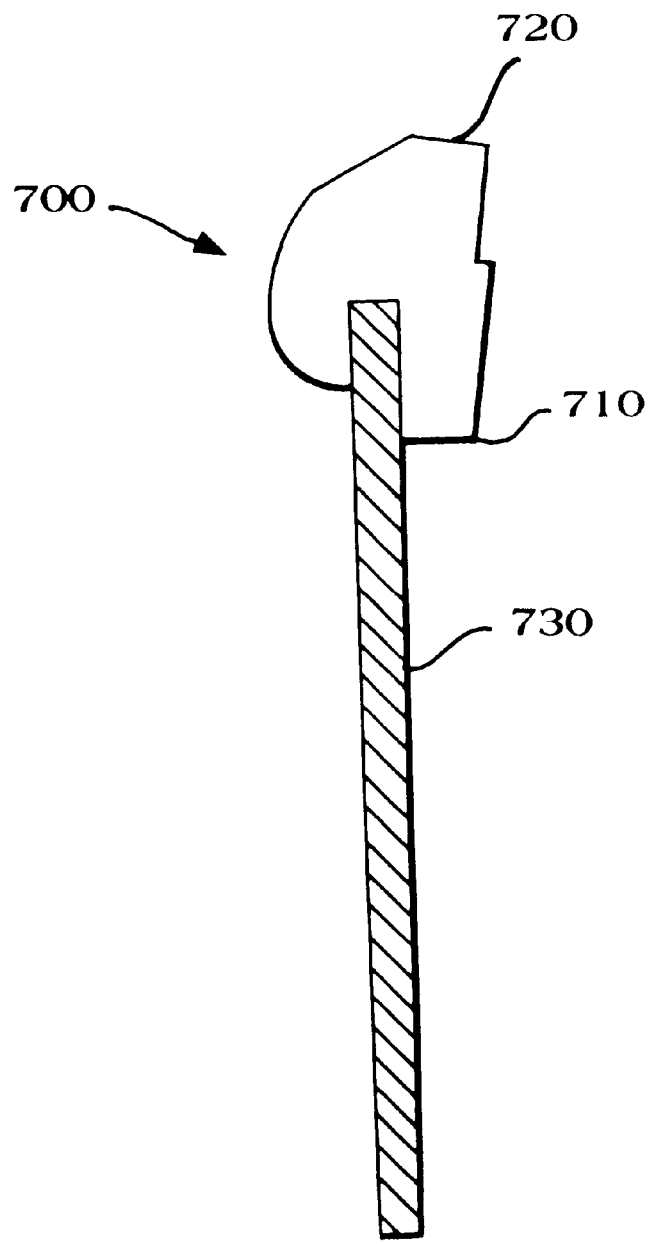
FIG. 7 shows a shield design where the amount of elastomer used is reduced.

FIG. 7 shows a shield design 700 where the amount of elastomer used is reduced greatly, e.g., by 50% to 70%. Only a sufficient amount of elastomer 710 at the shield OD area 720 for bonding to the steel back 730 is required. This large decrease in the elastomer should reduce the outgassing potential of the shield 700. In the disk drive environment, reduced chemical contamination is a necessity for reliable performance of the disk drive.

Figure 8:
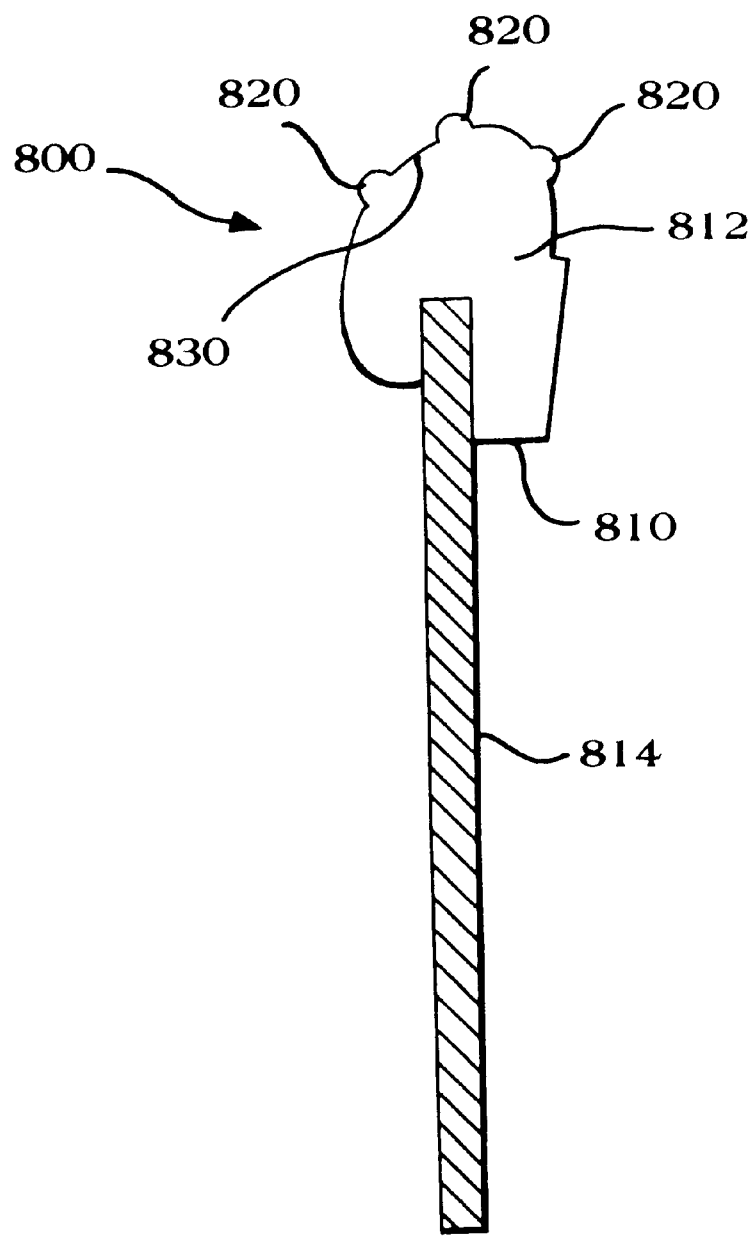
FIG. 8 shows an improved design of the shield surface at the bearing outer ring contact area and an elastomer having a reduced area according to the present invention.

FIG. 8 combines the teachings of FIGS. 6 and 7. In FIG. 8, the elastomer is minimized 810 at the shield OD area 812 and is bonded only along a portion of the steel back 814. In addition, ridges 820 are formed in the outer ring contact area 830. Again, the large decrease in the elastomer 810 should reduce the outgassing potential of the shield 800.

In FIGS. 6–8 as described above, the elastomer may comprise a fluoropolymer material. By various experiments, including stationary and rotating experiments, it has been adequately shown that nitrile shields exhibit the formation of oil droplets on the outside surface of the shield, and in distinct contrast to this, fluoropolymer shields do not form any oil droplets. The oil droplets formed on the nitrile shields pose an increased surface area for evaporation and thus hydrocarbon contamination in the disk drives. Also, large droplets could be slung to outer radii by centrifugal force and cause increased oil loss over a period of time. As the oil droplets escape the nitrile shield surface, there is continual supply of oil from the bearing grease for the formation of new oil droplets. Thus, over a period of time, via this mechanism, there could be increased depletion of oil from the inside of the bearing affecting bearing reliability. For these reasons, the use of a fluoropolymer shield material, such as Viton® from DuPont Dow Elastomers or Fluorel™ from Dyneon (Dyneon is a worldwide joint venture between 3M Specialty Fluoropolymers and the Hostaflon® PTFE and fluorothermoplastic business of Hoechst AG).

Figure 9:
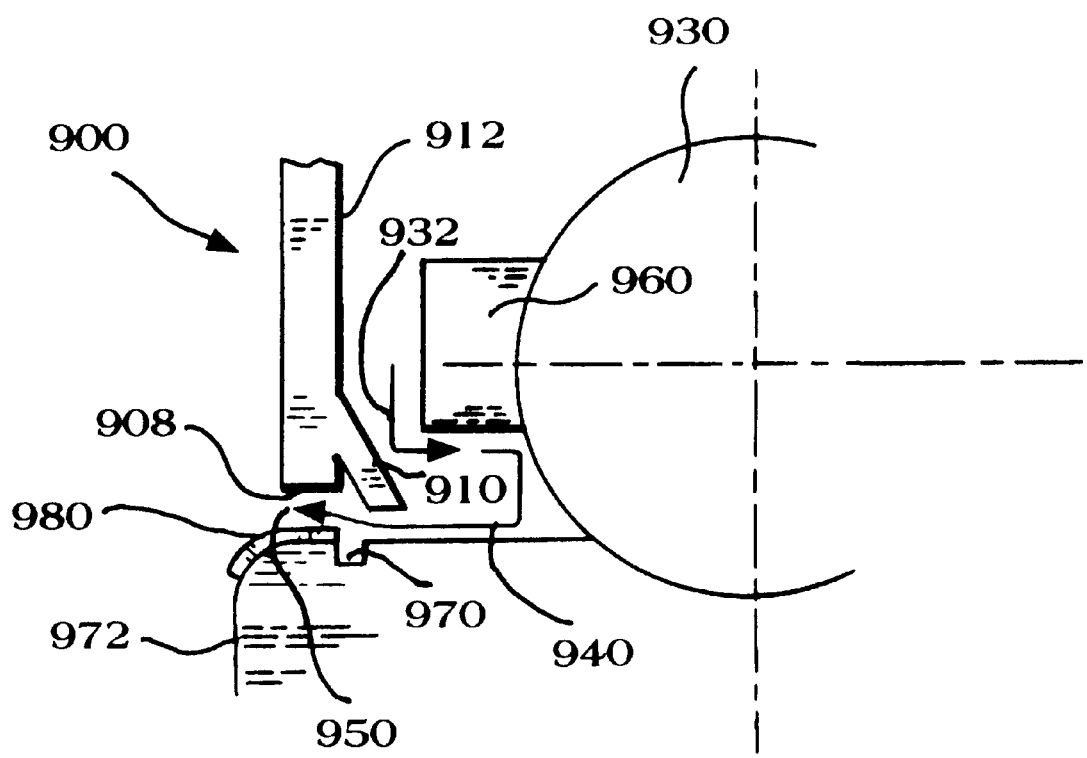
FIG. 9 illustrates a shield having a lip on the ID surface.

FIG. 9 illustrates a shield 900 having a lip 910 on the ID surface 912. FIG. 9 is applicable to bearings having an inner race without any step thereon. In FIG. 9, the lip 910 on the inside ID surface 912 of the shield 900 helps divert the aerosol back toward the bearing 930. Any aerosol escape has to first negotiate a 90 degree inward bend 932 and then has to negotiate a further 180 degree bend 940 before getting out of the shield ID gap 950. The lip 910 shown in FIG. 9 can be easily included in the injection molding process. Accordingly, FIG. 9 shows a shield 900 having a double lip 910 configuration to increase the labyrinth resistance to flow. Also, the shield ID gap 950 can be made smaller on one 908 or both 908, 910 lips based on manufacturing considerations. The advantage of this type of a design is that it will not interfere with the cage 960 or the balls 930, and does not require any additional axial room compared with the conventional shield.

In FIG. 9, a small shallow groove 970 is also shown on the outer diameter or the inner race 972. As shown in the FIG. 9, a barrier film 980 can be applied to the left of the groove 970 with the groove 970 acting as the limiter for the extent of the barrier film 980. This barrier film 980 can be dip coated or painted on with a commercially fluorinated material which is available in a solution form. e.g. Nyebar for from William Nye Co. Other forms of barrier film include deposited Teflon (PTFE) or possibly even a Teflon sleeve pressed on to the inner race 972.

Figure 10:
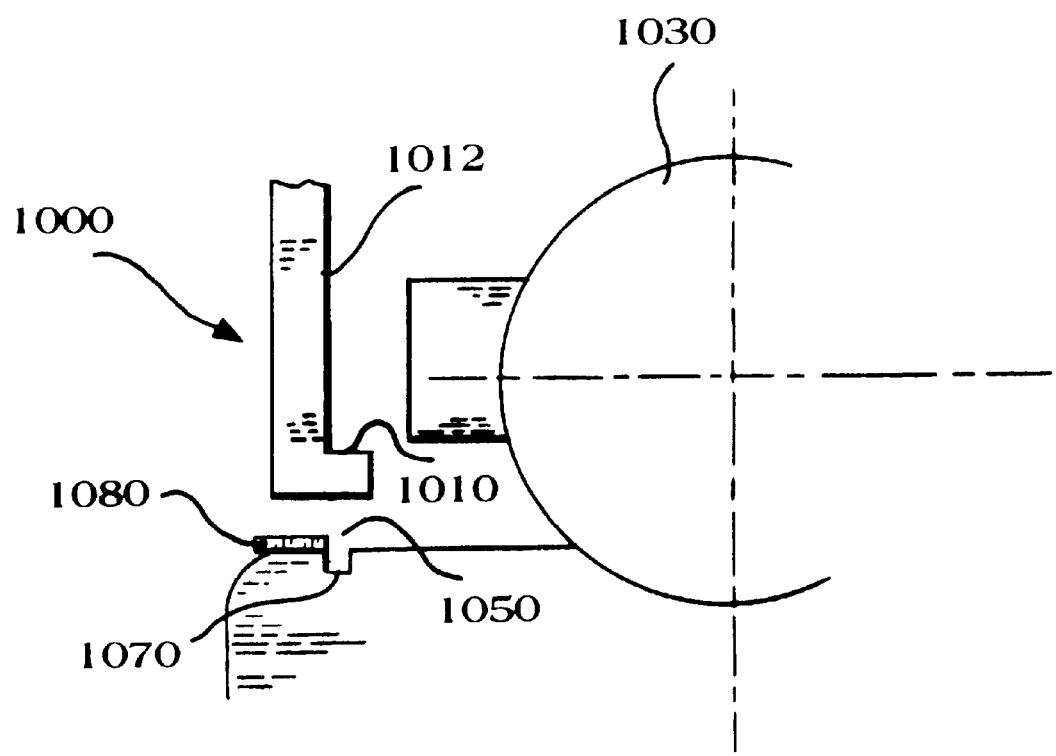
FIG. 10 shows a shield having an L-configuration on the shield ID side.

FIG. 10 shows a shield 1000 having an L-configuration 1010 on the shield ID side 1012. Similar to the lip described above with reference to FIG. 9, the L-configuration 1010 helps divert the aerosol back toward the bearing 1030. However, the L-configuration 1010 may be easier to manufacture. The shield ID gap 1050 is once again based on manufacturing considerations. Again, a barrier film 1080 can be applied to the left of the groove 1070 with the groove 1070 acting as the limiter for the extent of the barrier film 1080.

Figure 11:
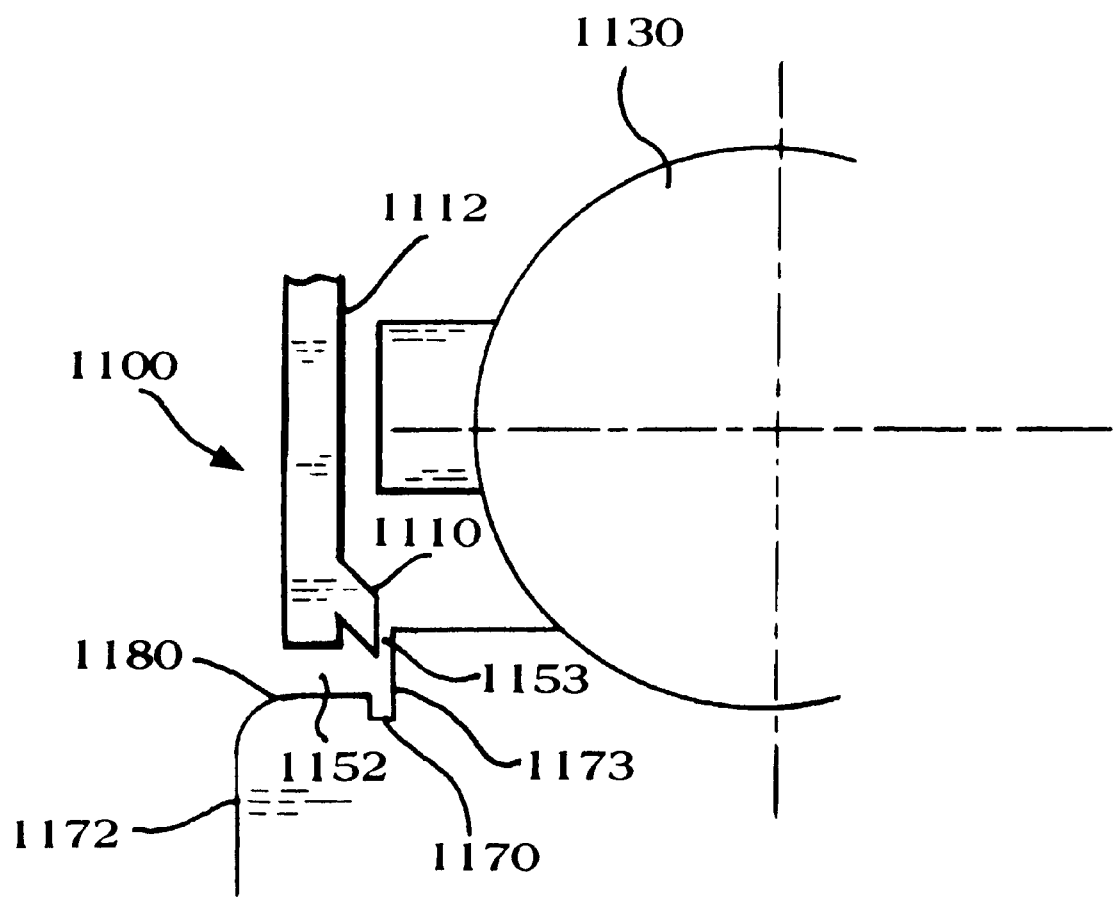
FIG. 11 shows a shield having double lip configuration for an inner race with a step.

FIG. 11 shows a shield 1100 having double lip configuration 1010 for an inner race 1172 with a step 1173. The second lip 1110 faces the step 1173 as shown in FIG. 11. The gaps 1152, 1153 are based on manufacturing considerations. However, during operation there is a relative axial movement of the races 1172 (outer race not shown) based on the axial preload and the actual gaps 1152, 1153 will be larger on one side of the bearing and smaller on the other side of the bearing. The groove 1170 for limiting the extent of the barrier film 1180 is located right at the step 1173.

Figure 12:
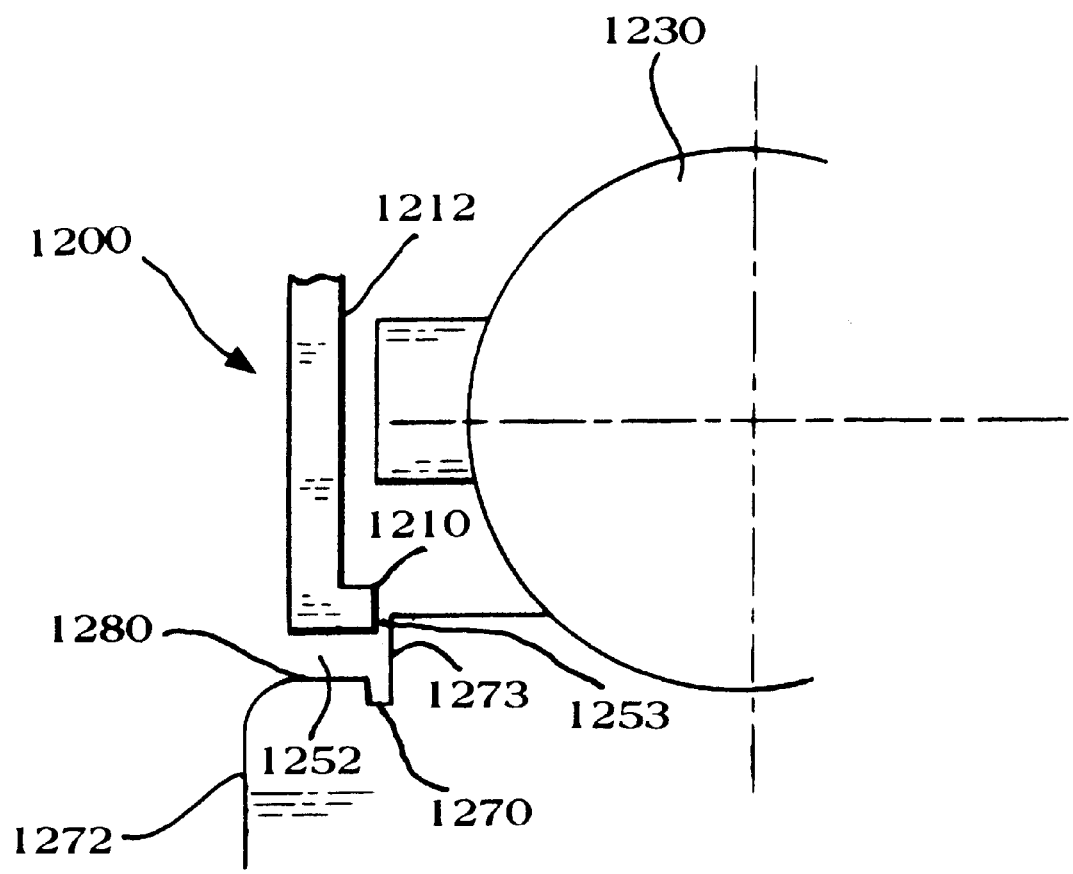
FIG. 12 illustrates a shield having an L-shaped configuration for a bearing with a step in the inner race.

FIG. 12 illustrates a shield 1200 having an L-shaped configuration 1210 for a bearing with a step 1273 in the inner race 1272. The end face 1210 of the shield 1200 faces the side surface of the step 1273 in the inner race 1272 and the actual gaps 1252, 1253 vary based on the magnitude and direction of the preload. The groove 1270 limits the extent of the barrier film 1280 similar to that shown in FIG. 11.

Experiments done using commercially available stainless steel shields show somewhat higher weight loss comparable to nitrile shields. According to the present invention, improved stainless steel shields are provided that ensure better contact at shield/outer ring contact areas and thus offer better sealing.

Figure 5:
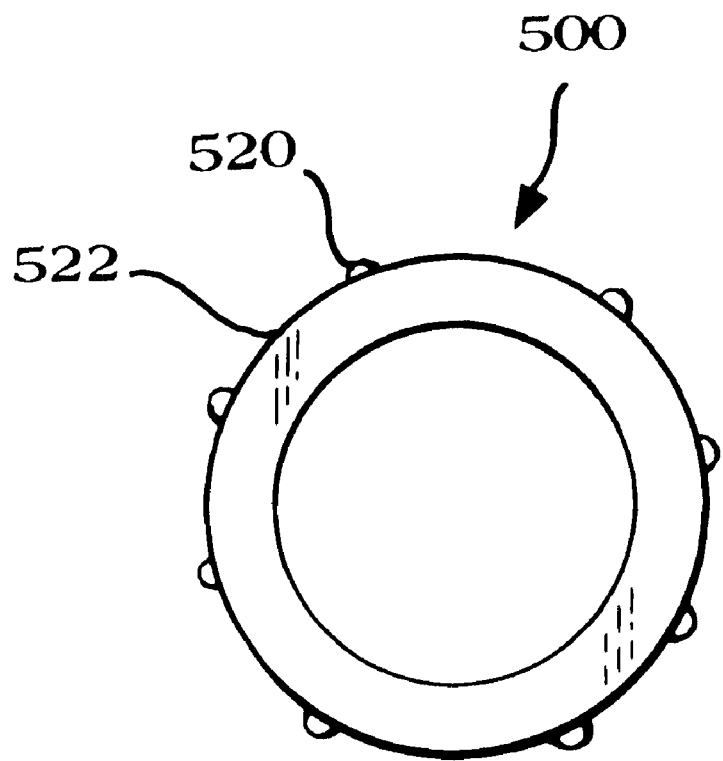
FIG. 5 shows the rear view of the stainless steel shield of FIG. 4.
Figure 13:
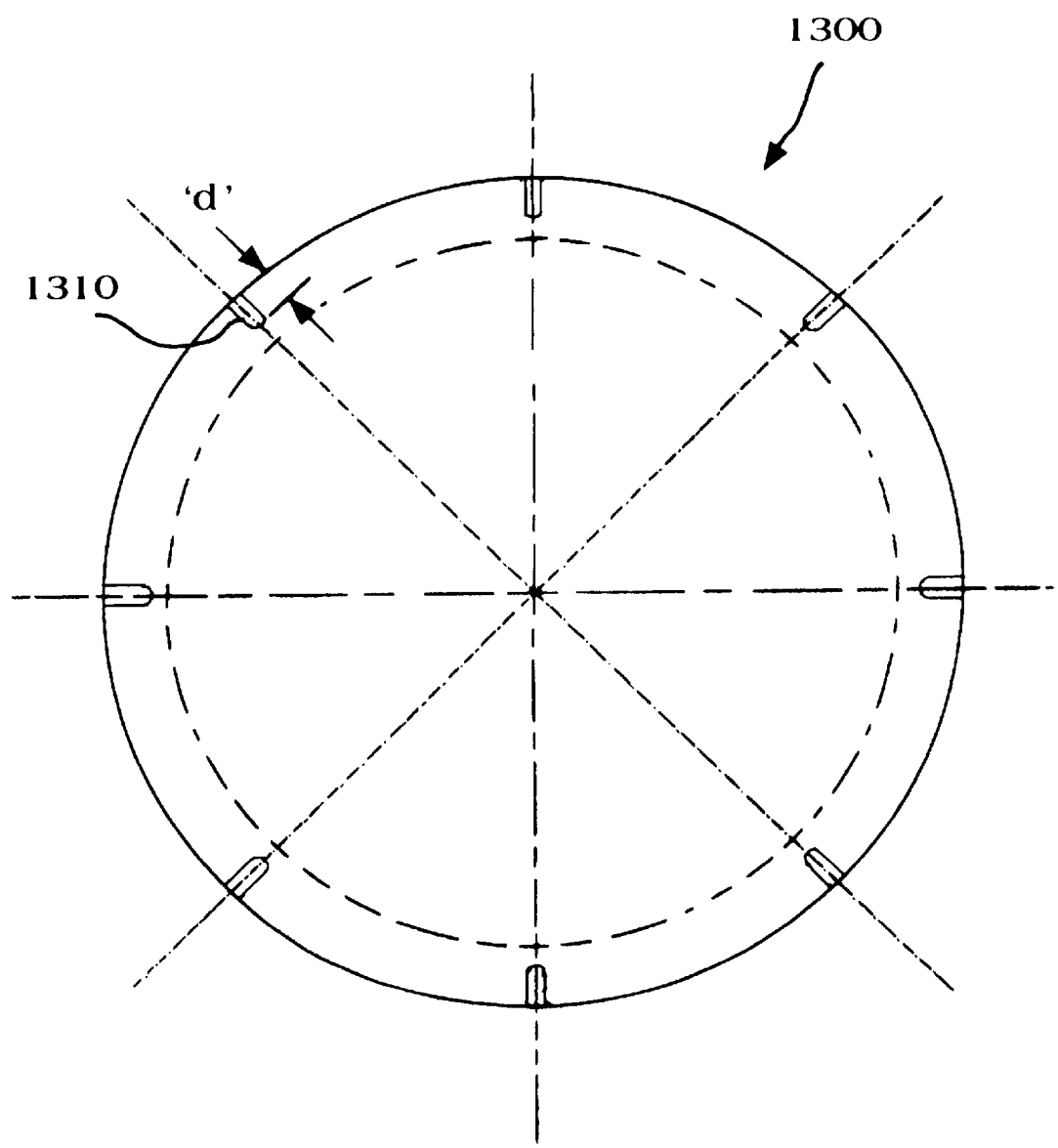
FIG. 13 shows the layout of a stainless steel shield before it is formed and folded at the OD side.

FIG. 13 shows the layout of a stainless steel shield 1300 before it is formed and folded at the OD side. According to the present invention, the radial extent 'd' 1310 of the slots is optimized, i.e., the minimum required to permit easy folding is determined, so that upon folding no humps 520 like those shown in FIG. 5 are present. This assures good metal to metal contact on the inside surface of the groove (not shown) in the outer race.

Figure 14:
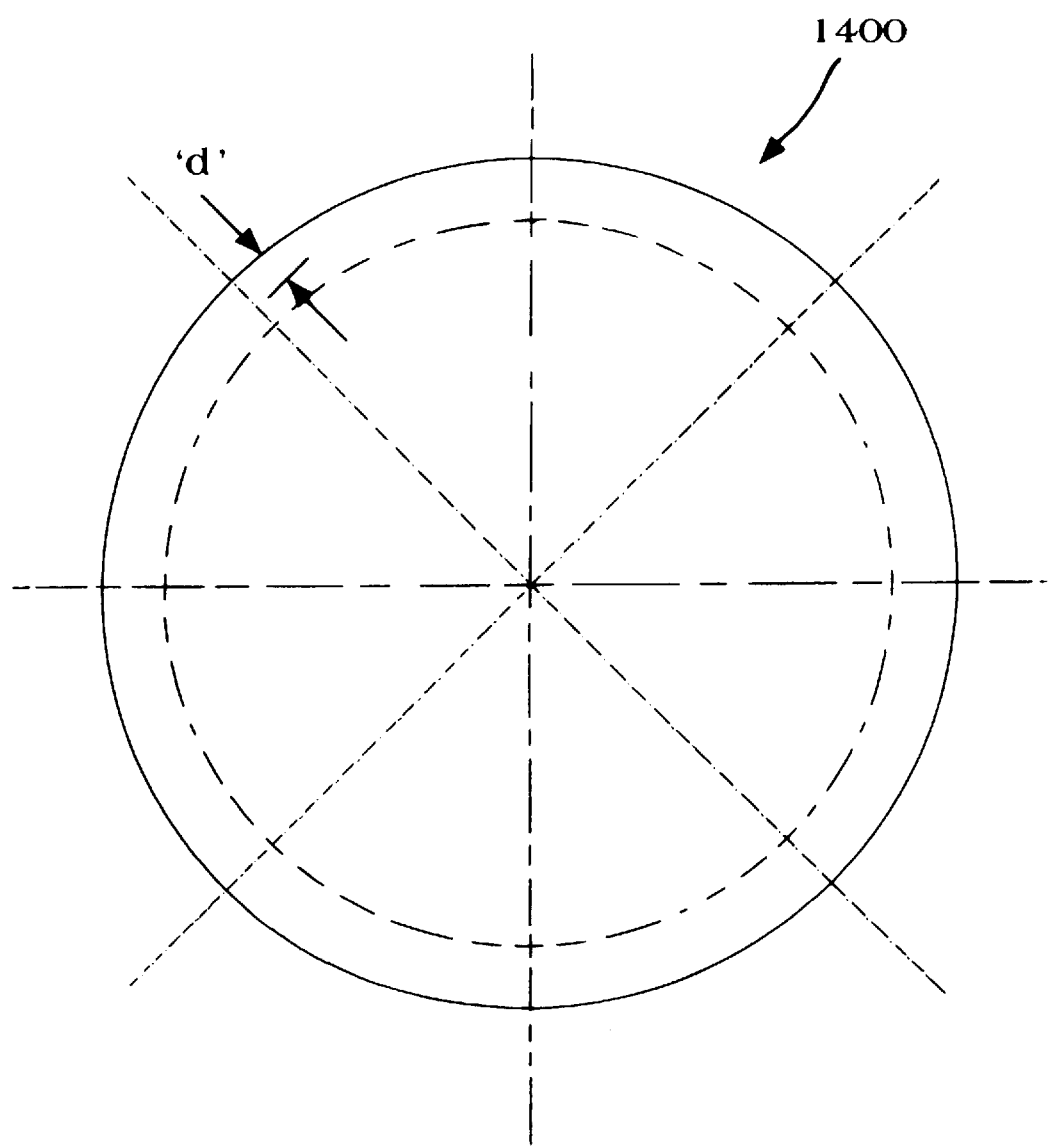
FIG. 14 illustrates another embodiment according to the present invention which provides for a slotless shield.

FIG. 14 illustrates another embodiment according to the present invention which provides for a slotless shield 1400. To bend the shield 1400, an increase in the bending forces will be required to perform the forming operation. However, the slotless shield 1400 will provide good sealing.

Figure 15:
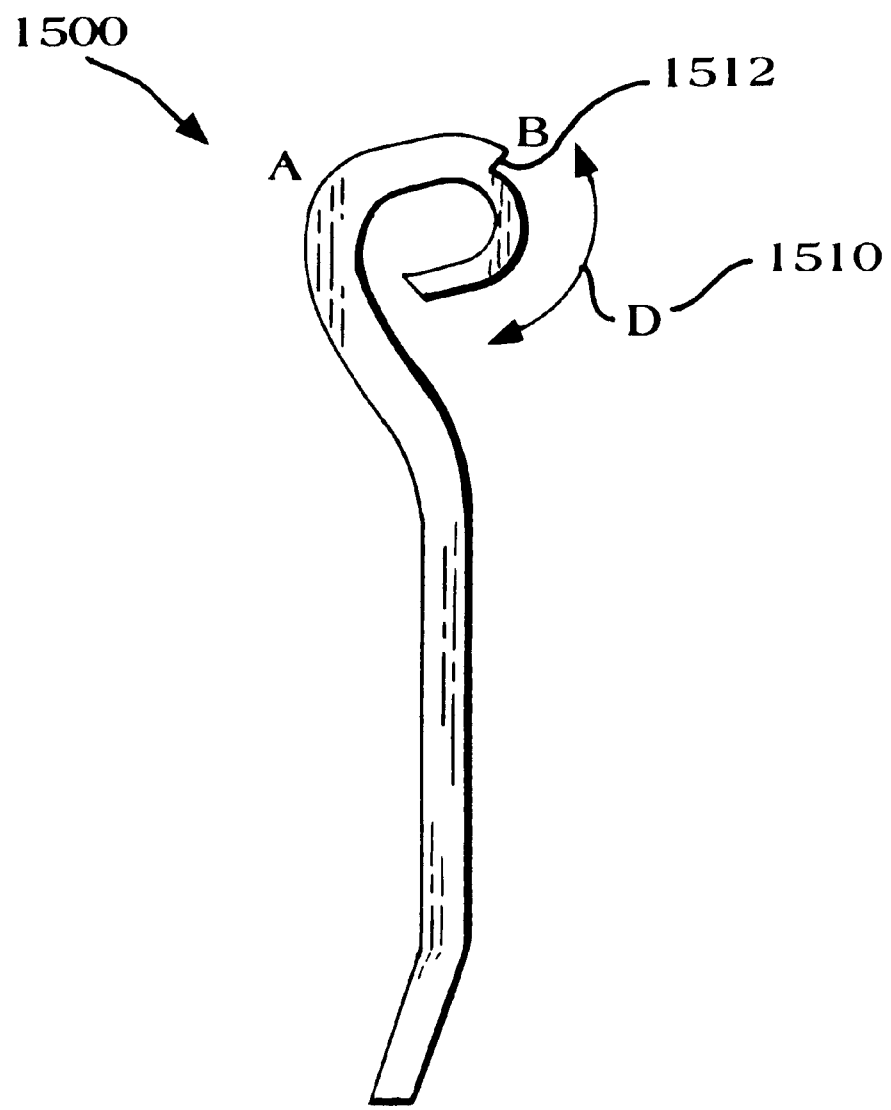
FIG. 15 illustrates a shield formed using a two stage forming operation, where the metal in the OD area up to about a predetermined radial extent is thinned out in the first forming operation and the second stage forming imparts the required shape to the shield.

FIG. 15 illustrates a shield 1500 according to yet another embodiment of the present invention, wherein the shield 1500 is formed using a two stage forming operation, where the metal in the OD area up to about a predetermined radial extent of 'd' 1510 is thinned out 1512 in the first forming operation and the second stage forming imparts the required shape to the shield.

Figure 1:
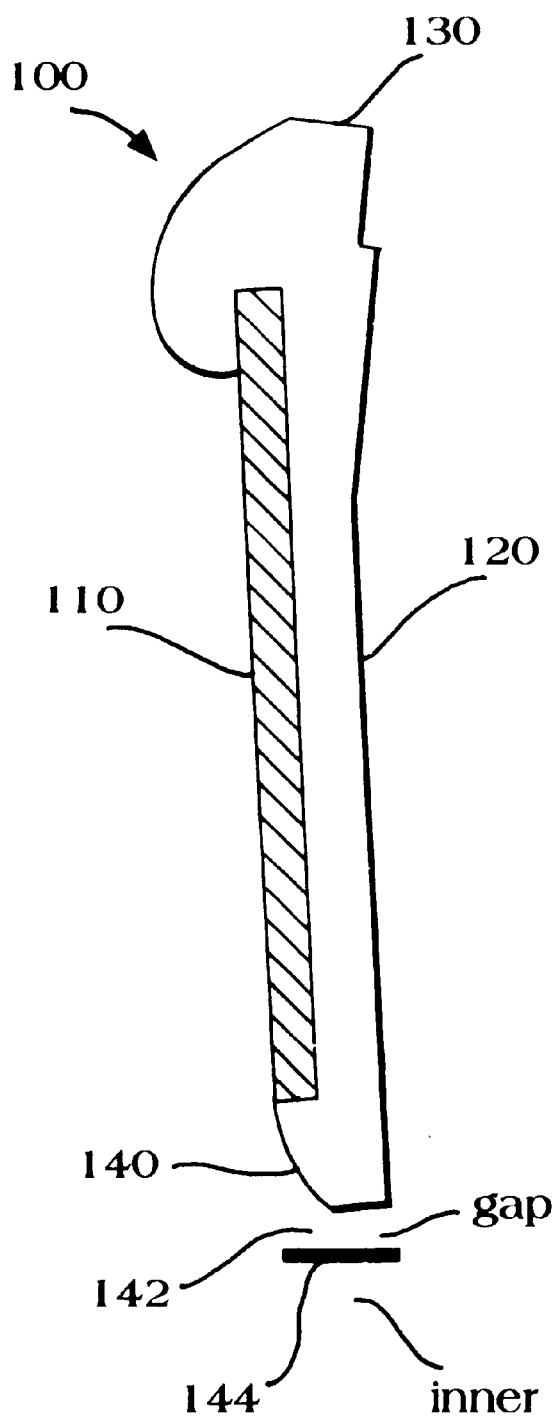
FIG. 1 shows the type of shield currently used in most types of DASD spindle motors in use today.
Figure 2:
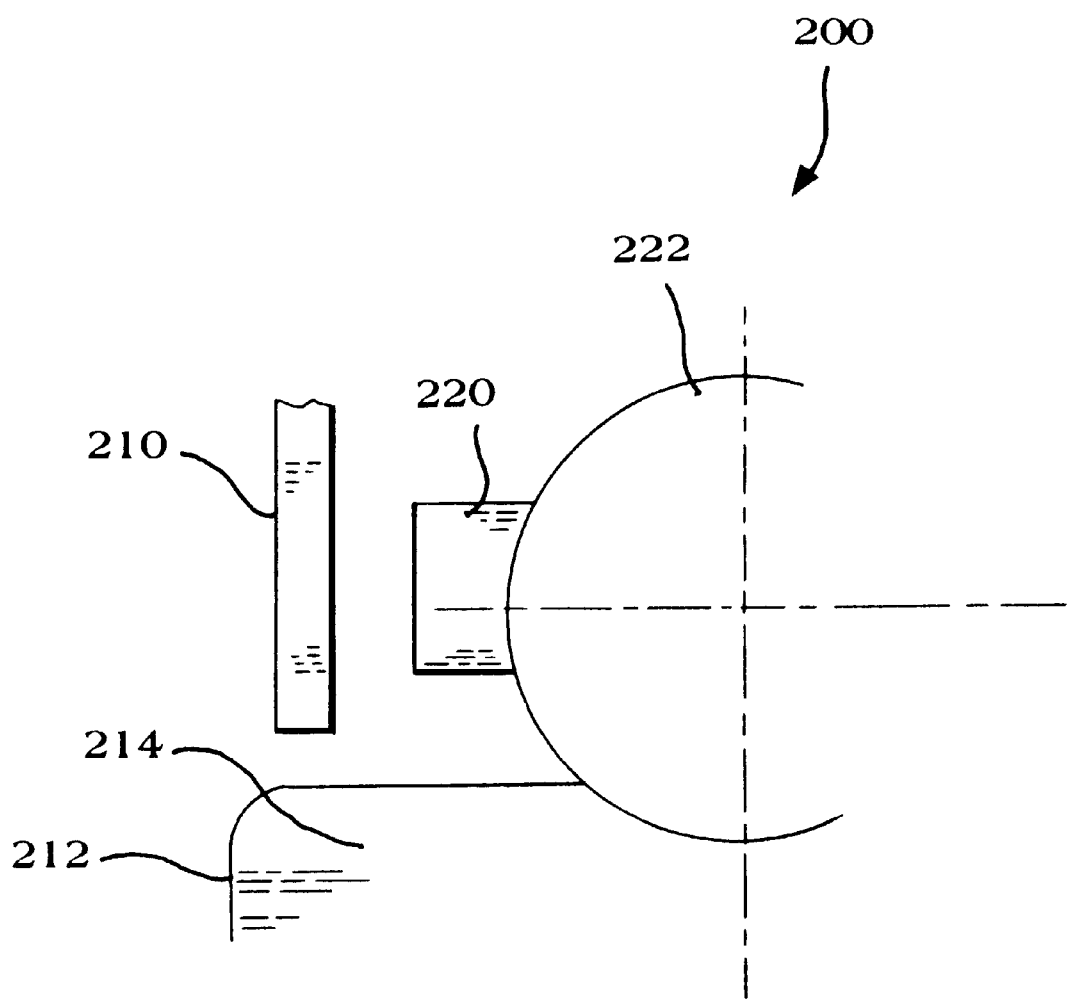
FIG. 2 shows a cross sectional view of the ball bearing including a shield.
Figure 3:
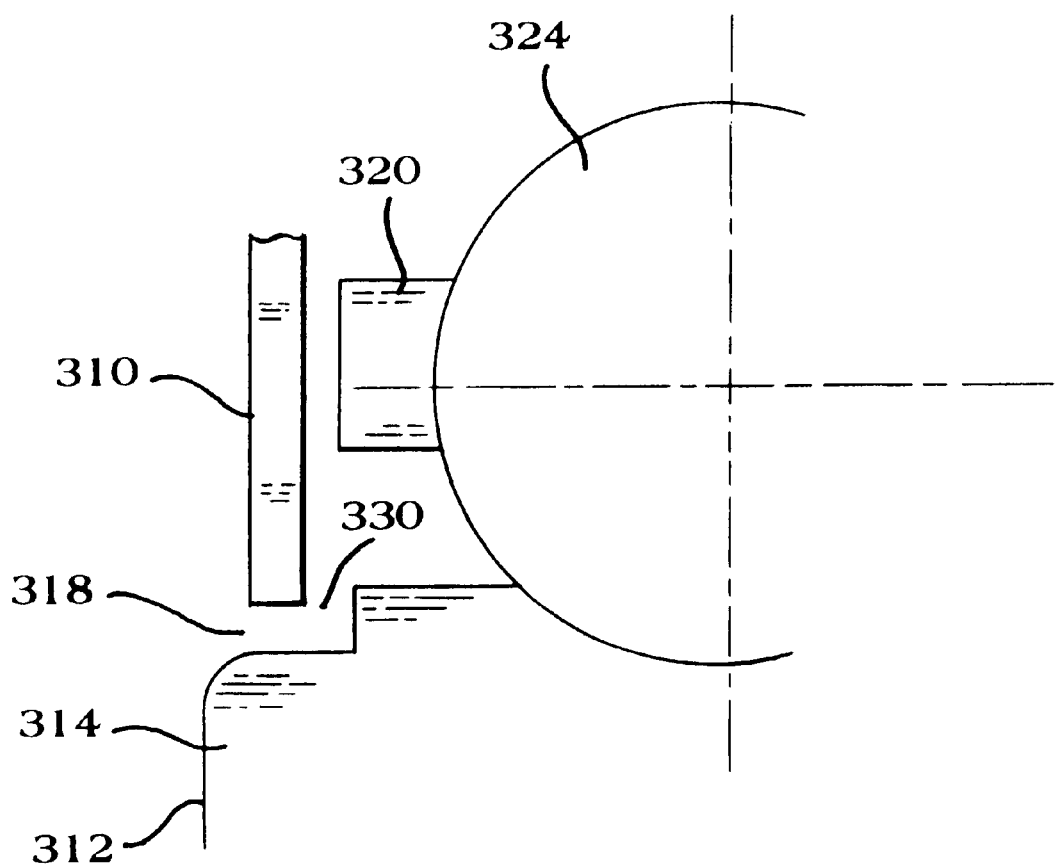
FIG. 3 show a cross sectional view of the ball bearing including a shield and step structure in the inner race.
Figure 4:
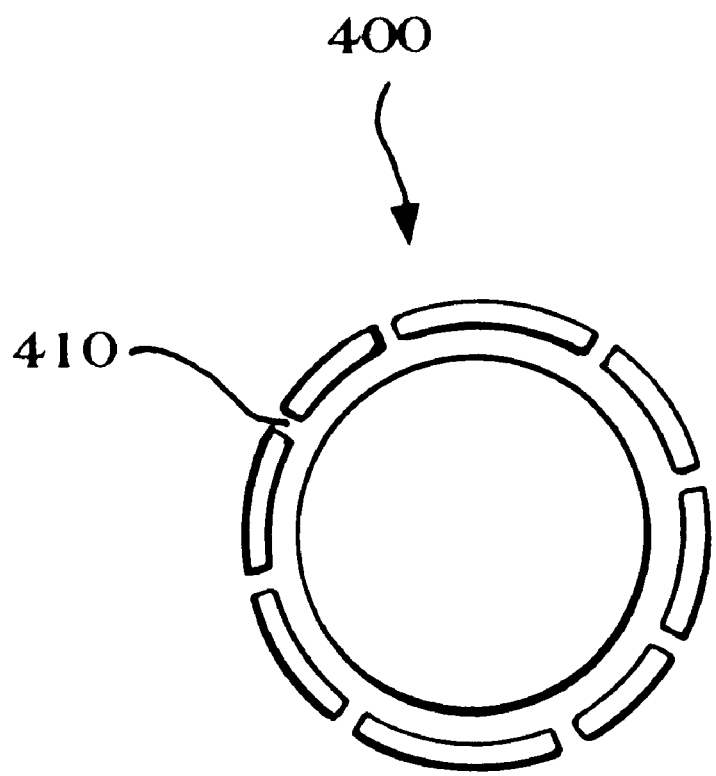
FIG. 4 shows the front view of a stainless steel shield for a ball bearing.
Figure 16:
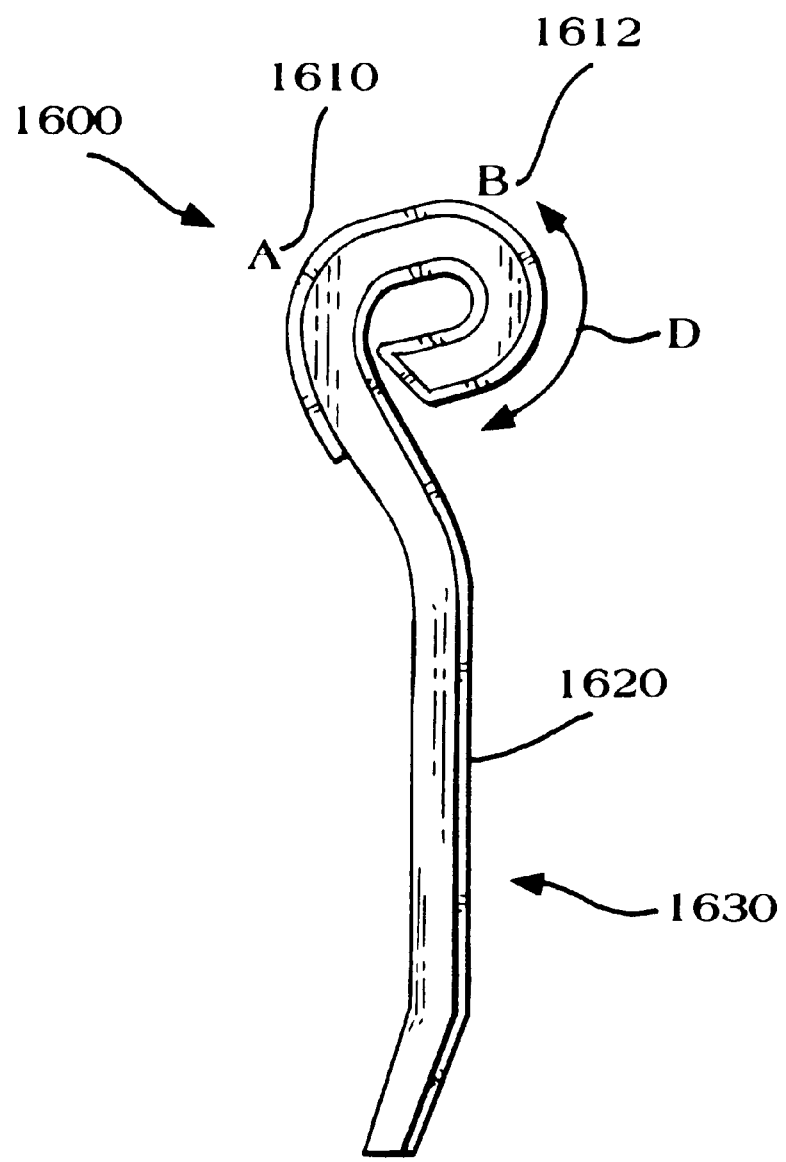
FIG. 16 shows the cross sectional view of a stainless steel shield after installation into the bearing outer ring groove.

FIG. 16 shows the cross sectional view 1600 of a stainless shield after installation into the bearing outer ring groove. Intimate metal to metal contact is expected to occur in the two regions marked 'A' 1610 and 'B' 1612. At the slots 410 as illustrated in FIG. 4, contact is possible only at 'A' 1610 since no metal is present at 'B' 1612.

In accordance with the present invention, a stainless steel shield, of any prior stainless steel shield or of any stainless steel shield in accordance with the teachings described above, may be coated after forming with anywhere up to about 10 micrometer of an elastomer 1620 such as Parylene using a commercially available deposition process. The elastomer being deformable, easily conforms to the surface roughness and irregularities and provides intimate contact and sealing. This deposition process being a low temperature process does not distort the part. The process is also a low cost process because it is a batch process with conformal capabilities. Alternatively, the coating may comprises a deposit of soft metal, such as copper or brass, on the OD side 1630 of the shields. This is similar to sealing in vacuum systems. Those skilled in the art will recognize that higher seal insertion forces will be required for installation in this approach.

Figure 17:
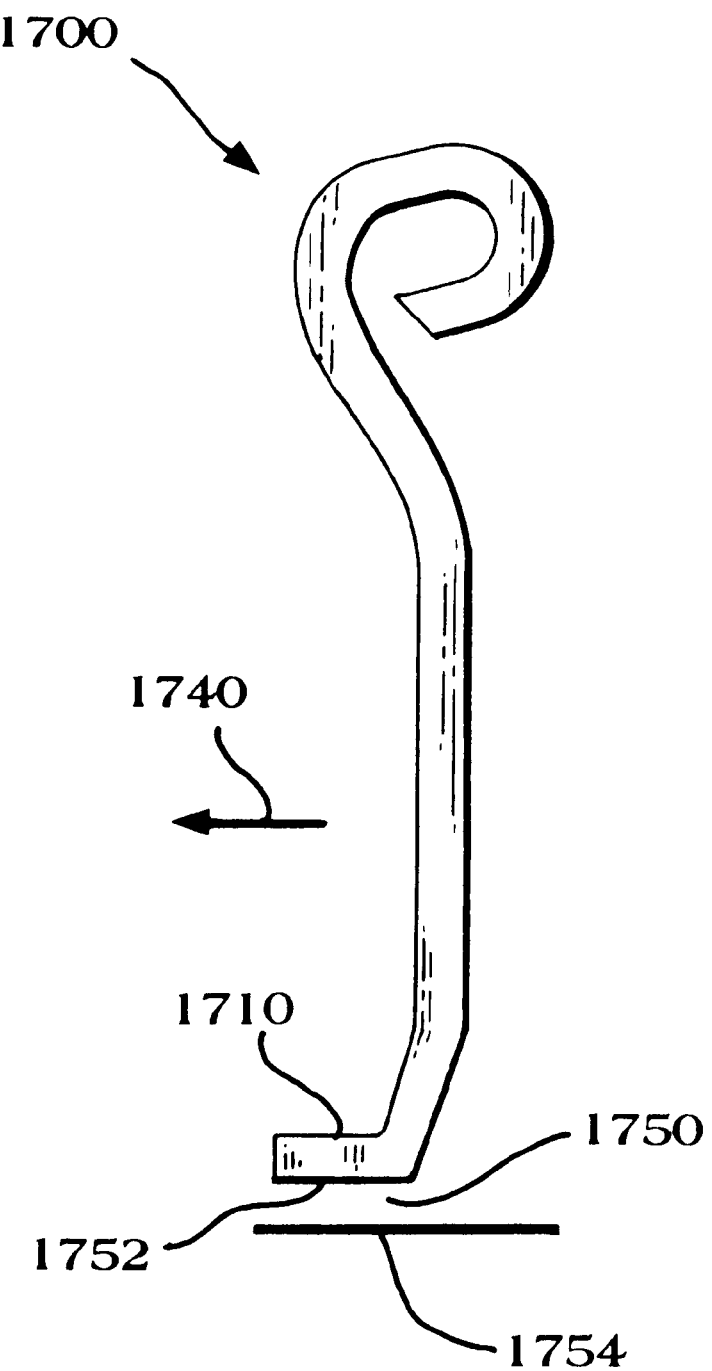
FIG. 17 shows the cross sectional view of a shield design according to the present invention, which incorporates an inward 90 degree bend in the shield.

FIG. 17 shows the cross sectional view of a shield design 1700 according to the present invention, which incorporates an inward 90 degree bend 1710 in the shield. The 90 degree bend 1710 accomplishes several things: (1) increases the labyrinth resistance of the shield ID gap 1750, because resistance is proportional to the length, (2) presents a tortuous path for the aerosol flow, and (3) acts as a catch for any grease that slumps on to the shield or gets thrown on the shield 1700 in the form of a lump which is fed back toward the bearing 1740 by centrifugal forces. Another feature that can be reasonably easily achieved is the smaller gap 1750 between the shield ID 1752 and the inner race 1754. This aspect of using smaller gap 1750 to increase the labyrinth resistance has already been discussed above. In the case of stainless shield, smaller gaps of 0.05 mm are achievable (2.5× smaller than today's gaps for steel shields and 4× smaller than rubber shields used currently).

Figure 18:
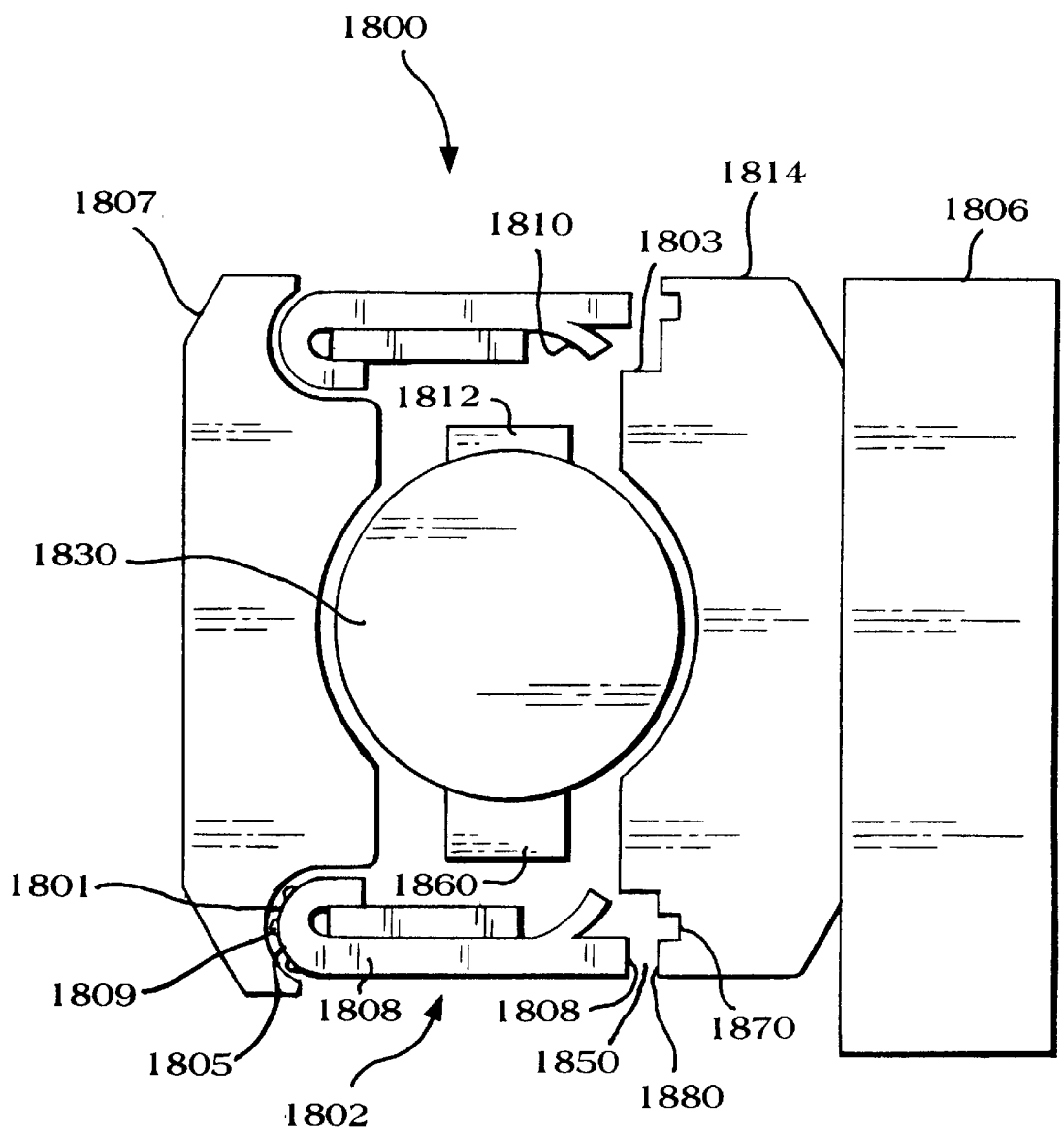
FIG. 18 illustrates a bearing having shield comprising a lip on the ID surface.

FIG. 18 illustrates a bearing 1800 having shield 1802 comprising a lip 1810 on the ID surface 1812. The inner race 1814, which is attached to the shaft 1806, includes a step 1803 thereon. In FIG. 18, the lip 1810 on the inside ID surface 1812 of the shield 1802 helps divert the aerosol back toward the ball 1830. The shield ID gap 1850 can be made smaller on one 1808 or both 1808, 1810 lips based on manufacturing considerations. The advantage of this type of a design is that it will not interfere with the cage 1860 or the balls 1830, and does not require any additional axial room compared with the conventional shield.

In FIG. 18, a small shallow groove 1870 is also shown on the outer diameter or the inner race 1814. As shown in the FIG. 18, a barrier film 1880 can be applied to the left of the groove 1870 with the groove 1870 acting as the limiter for the extent of the barrier film 1880. This barrier film 1880 can be dip coated or painted on with a commercially fluorinated material which is available in a solution form. e.g. Nyebar for from William Nye Co. Other forms of barrier film include deposited Teflon (PTFE) or possibly even a Teflon sleeve pressed on to the inner race 1814. The elastomer 1808 of the shield 1802 may include ridges 1809 that run along the circumference of the outer contact area 1805 of the shield 1802. Upon installation of the shield 1802 into the groove 1801 in the bearing outer ring 1807, these ridges 1809 deform greatly and conform to the surface of the groove 1801.

With all of the embodiments discussed above, a barrier film may be used. Returning to FIG. 9 for purposes of illustration only, a barrier film may be used to eliminate or limit the migration of oil on the surface of the groove in the outer ring. Moreover, such a barrier film may also be applied to the entire shield surface 900 as well as the groove in the outer ring (not shown). With regard to the outer ring, the groove itself will act as a limiter for the extent of the barrier film. This barrier film can be dip coated or painted on with a commercially fluorinated material which is available in a solution form, e.g., Nyebar from William Nye Co. and Fluorad from 3M Co. Other forms of barrier film include deposited Teflon (PTFE).

The embodiments discussed above greatly reduce grease/oil loss via creep or migration at the shield/outer ring interface and oil permeation and droplet formation at the shield surface in the case of Nitrile shields. Additional advantages of the above described embodiments are reduced chemical contamination due to reduction in the amount of elastomer used and reduced chemical contamination due to use of inert elastomer such as fluoropolymer, e.g., Viton made by DuPont Co., and Fluorel made by 3M Co. In addition judicious application of surface films as discussed above inhibits oil loss due to surface creep or migration mechanisms. Tortuous paths and labyrinth schemes reduce the oil and grease loss from the shield ID gap of DASD spindle ball bearings. Finally, improved stainless steel designs that assure good metal to metal contact on the inside surface of the groove in the outer ring and prevent oil and grease loss at the ID gap.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A ball bearing, comprising:

an inner race;

an outer race; and a ball bearing shield, disposed between the inner race and the outer race, for preventing oil and grease loss from the ball bearing, the ball bearing shield further comprising a contact end and a non-contact end, the shield further comprising an elastomeric body forming an outer contact area for engaging a surface of a groove in one of the inner and outer race, the surface comprising a first side, a second side and an end portion of the groove, the outer contact area further comprising ridges spaced along an outer circumference of the outer contact area, the ridges engaging the first side, second side and end portion of the surface of the groove and being compressed to conform to the surface of the groove for sealing the outer circumference of the outer contact area against the race.

2. The ball bearing of claim 1 wherein the elastomeric body comprises a fluoropolymer material for preventing the formation of oil thereon.

3. The ball bearing of claim 1 wherein the elastomeric body further comprises a barrier film applied thereto, the barrier film reducing movement of ball bearing lubricant on the shield.

* * * * *